(12) United States Patent
Kuo et al.

(10) Patent No.: US 6,563,846 B1
(45) Date of Patent: May 13, 2003

(54) MULTIFUNCTION OPTICAL TRANSMITTER FOR DWDM SYSTEM

(76) Inventors: Chien-Yu Kuo, 11613 Forest Spring Ct., Cupertino, CA (US) 95014; Niraj Gupta, 47634 Hoyt St., Fremont, CA (US) 94539

( * ) Notice: Subject to any disclaimer, the term of this patent is extended or adjusted under 35 U.S.C. 154(b) by 279 days.

(21) Appl. No.: 09/656,580

(22) Filed: Sep. 6, 2000

Related U.S. Application Data

(60) Provisional application No. 60/152,693, filed on Sep. 7, 1999, and provisional application No. 60/172,291, filed on Dec. 14, 1999.

(51) Int. Cl.[7] ............................................. H01S 3/13
(52) U.S. Cl. ........................ 372/29.02; 372/29.011; 372/29.021; 372/32; 372/34
(58) Field of Search ...................... 372/29.02, 29.021, 372/32, 34, 29.011, 38.01; 359/187

(56) References Cited

U.S. PATENT DOCUMENTS

| | | | |
|---|---|---|---|
| 5,107,512 A | * | 4/1992 | Shibutani ............... 372/29.021 |
| 6,064,681 A | | 5/2000 | Ackerman |
| 6,134,253 A | | 10/2000 | Munks et al. |
| 6,181,717 B1 | * | 1/2001 | Kner et al. .................... 372/34 |
| 6,222,861 B1 | * | 4/2001 | Kuo et al. ..................... 372/32 |
| 6,233,080 B1 | * | 5/2001 | Brenner et al. ............. 359/181 |

* cited by examiner

Primary Examiner—Albert W. Paladini

(57) ABSTRACT

For optical transmitters in DWDM network systems, a method of operating the semiconductor laser which provides the output of the optical transmitter. The output power and wavelength of the semiconductor laser is set by controlling the bias current and operating temperature according to a closed theoretical mathematical form. The form has the variables of output power, wavelength, bias current and temperature related to each other by empirically determined coefficients. In this manner the optical transmitter can efficiently vary its output power while maintaining its wavelength constant, or vary its wavelength while maintaining its output power constant.

16 Claims, 5 Drawing Sheets

MULTIFUNCTION OPTICAL TRANSMITTER FOR DWDM SYSTEM

CROSS-REFERENCE TO RELATED APPLICATIONS

The present patent application claims priority from Provisional Patent Application No. 60/152,693, filed Sep. 7, 1999, and No. 60/172,291, filed Dec. 14, 1999, both of which are incorporated by reference herein.

BACKGROUND OF THE INVENTION

The present patent application is related to fiberoptic networks, and, in particular, optical transmitters for WDM and DWDM network systems.

In many modern fiberoptic networks, the wavelength, and hence the frequency, of the optical signal plays an important role. In WDM (Wavelength Division Multiplexing) fiberoptic networks, for example, optical signals are sent at predetermined wavelengths over optical fibers. Each predetermined wavelength, as defined by the ITU (International Telecommunications Union), forms a communication channel in the network. An advanced version of WDM networks is the DWDM (Dense Wavelength Division Multiplexing) network in which the number of wavelength channels is increased by reducing the channel wavelength separation. It should be noted that the term, DWDM, is used hereafter to refer to both WDM and DWDM networks, and other fiberoptic networks which rely upon wavelength to define communication channels, unless indicated otherwise.

Another important parameter of the optical signals in an fiberoptic network is power. With many different wavelength channels being carried on a single optical fiber, it is desirable that the power of the different channel signals be controlled to compensate for the spectral nonuniformity of the fiber and other non-uniform losses in the network. Conventionally, channel power control has been achieved by an external variable optical attenuator (VOA) in the optical path for each channel, but the addition of the VOA to the system architecture has undesirable consequences, such as added optical insertion loss, reduced reliability, added cost and complexity, and the consumption of valuable space in the optical transmitter system in the network. Hence it is desirable to control power at the transmitter itself. This has been done typically by changing the forward bias current of the semiconductor lasers which are commonly used in network optical transmitters. This technique alone, however, is not practical since the change in the bias current also causes a change in the output wavelength of a semiconductor laser. Thus action moves the transmitter out of the ITU tuning grid, the selected DWDM channel wavelengths, and out of the wavelength locking range. An iterative process must be used to obtain the desired power at the desired wavelength.

On the other hand, to better control output wavelength and power, the present invention utilizes an algorithm based on a closed mathematical form for the physical relationships between a laser's optical power, wavelength, bias current and temperature for a multifunction optical WDM transmitter. Control over the power of wavelength channel signals without changing the output wavelength is efficiently effected, among different applications of the present invention.

SUMMARY OF THE INVENTION

The present invention provides for a method of operating a laser transmitter system for a DWDM network. A semiconductor laser generates an output signal for the laser transmitter system. The output power and wavelength of the semiconductor laser are targeted by setting a bias current and operating temperature of the semiconductor laser according to a closed mathematical form relating variables of output power, wavelength, bias current and operating temperature of the semiconductor laser. The variables are related to each other by empirically determined coefficients. The closed mathematical form relating the original operating condition to a different condition follows the equation:

$$I_{tho}[\exp(\Delta T/T_o^*-1)]+1/\eta_o[P_1 \exp((\Delta T/T_1^*)-P_o]+(\Delta v+\alpha_t\Delta T)/(\alpha_i+\beta_i\Delta T)=0$$

where $\Delta T$ is the change in temperature, $P_1-P_o$ is the change in output power, and $\Delta v$ is the change in frequency, and $I_{tho}$, $T_o^*$, $\eta_o$, $T_1^*$, $P_o$, $\alpha_t$, $\alpha_i$, and $\beta_i$ are the empirically determined parametric coefficients. The subscript o always represents the original conditions, whereas 1 refers to desired new conditions. $T_o$ is the original or preset temperature, typically set at absolute temperature of 293° K to 298° K; $I_{tho}$ is the original or preset threshold current at the preset temperature $T_o$; $\eta_o$ is the power slope efficiency at $T_o$; $\Delta v$ is the desired difference in frequency; $P_o$ is the power at $T_o$ and $I_o$; $\alpha_t$ is the frequency change, with respect to temperature variation at $\Delta I=0$; $\Delta I$ is equal to $I_1-I_o$; $\Delta T$ is equal to $T_1-T_o$; $\alpha_i$ is the frequency change with respect to current variation at $\Delta T=0$; and $\beta_i$ is the rate of change of $\alpha_i$ with respect to temperature change.

Another equation of the closed mathematical form is:

$$\Delta I=-(\Delta v+\alpha_t\Delta T)/(\alpha_i+\beta_i\Delta T)$$

According to the present invention, the output wavelength of the semiconductor laser can be kept constant as its output power is varied. Likewise, the output power can be kept constant as the wavelength is varied, or both the output power and the wavelength can be varied.

DESCRIPTION OF THE SPECIFIC EMBODIMENTS

Figure 1:
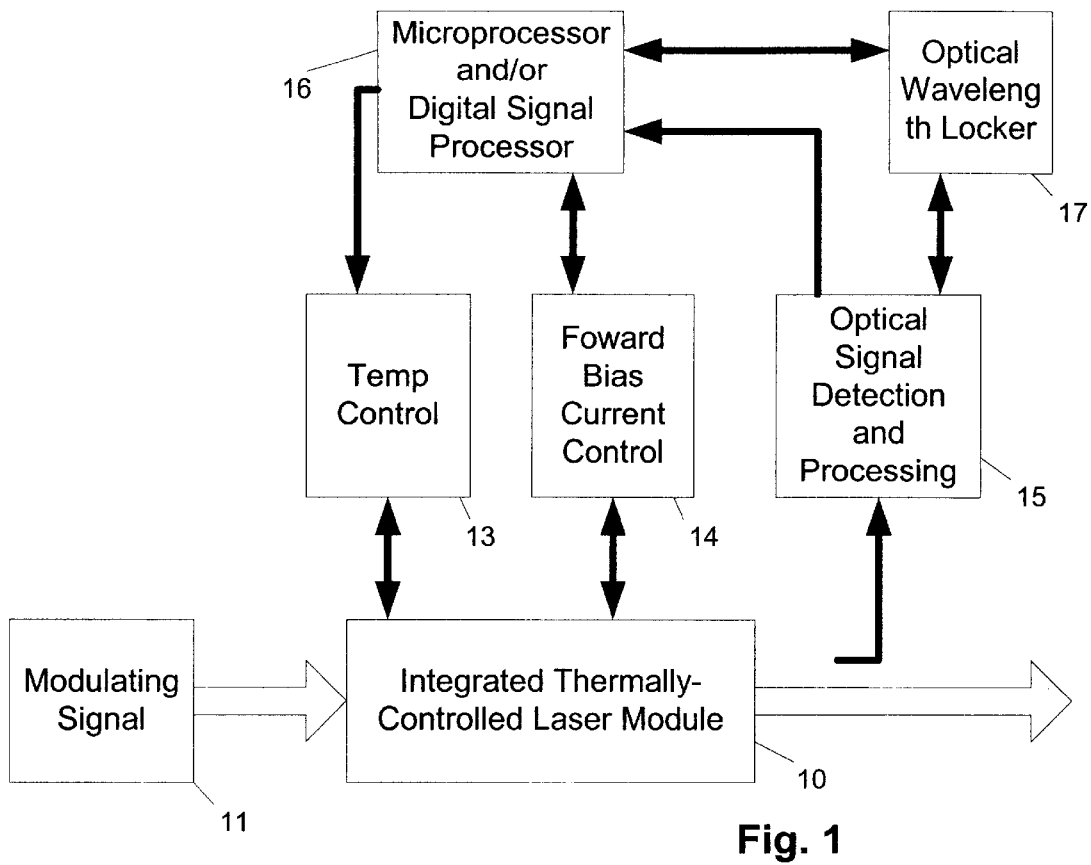
FIG. 1 illustrates the general organization of an optical transmitter system.

FIG. 1 illustrates the organization of an optical transmitter which could operate according to an embodiment of the present invention. An integrated thermally-controlled laser module 10 holds a laser diode, i.e., the semiconductor laser, the source of the optical output of the optical transmitter. To carry information on the laser output, the output of the laser diode is modulated by a modulating signal 11. As illustrated, the modulating signal 11 is applied directly to the input of the laser module 10. Alternatively, the modulating signal 11 can control an external optical modulator in the output path of the laser module 10 to modulate the output of the laser diode of the module 10.

Also connected to the laser module 10 is a temperature control block 13 which monitors and controls the temperature of the laser diode in the module 10. Likewise, a current control block 14 monitors and controls the forward bias current of the laser diode. Both the temperature control block 13 and the current control block 14 send their respectively monitored signals from the module 10 to the control unit 16 which has a microprocessor, microcontroller or digital signal processor, which forms the "brains" of the control unit, to compute the parameters of the modulating signal 11. In response to the monitored signals from the blocks 13 and 14, the control unit 16 sends control signals back to the blocks 13 and 14 to control the temperature and forward bias current of the laser diode in the module 10. To monitor the output of the laser module 10 (or the external modulator), a small amount of the output is sampled and processed by a detection and processing block 15 which receives the sampled optical signals and determines the absolute noise and power of the optical output. The output of the block 15 is in the form of electrical signals which are sent to the control unit 16. The detection and processing block 15 also sends some of the sampled output from the module 10 (or external modulator) to a wavelength locker block 17 which accurately resolves the wavelength of the optical output with respect to a WDM channel wavelength or other standard wavelength of the optical spectrum. The wavelength locker block 17 sends electrical signals regarding the precise wavelength of the optical output to the control unit 16.

Figure 2:
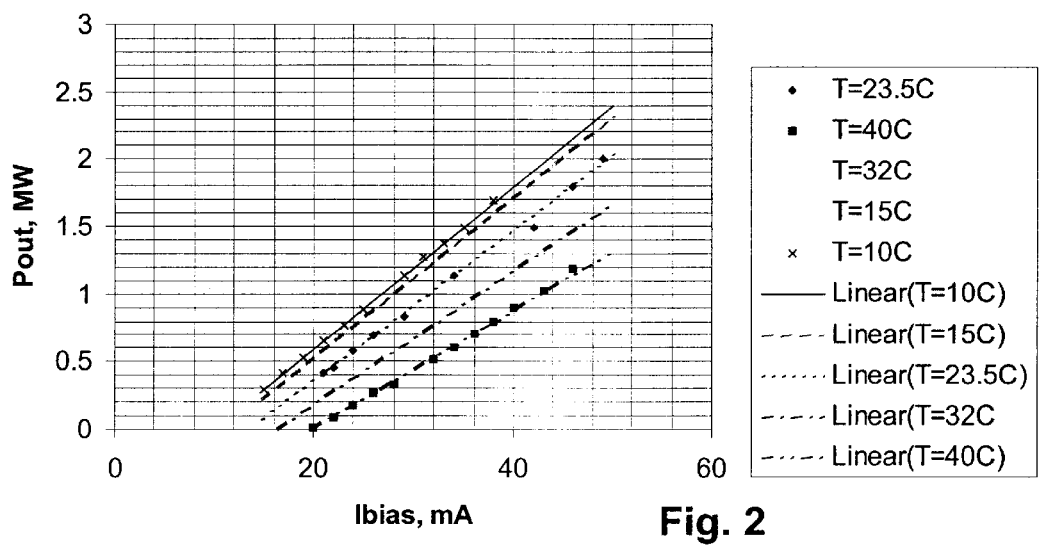
FIG. 2 is a graph of bias current versus output power of empirical data for a semiconductor DFB laser.
Figure 5:
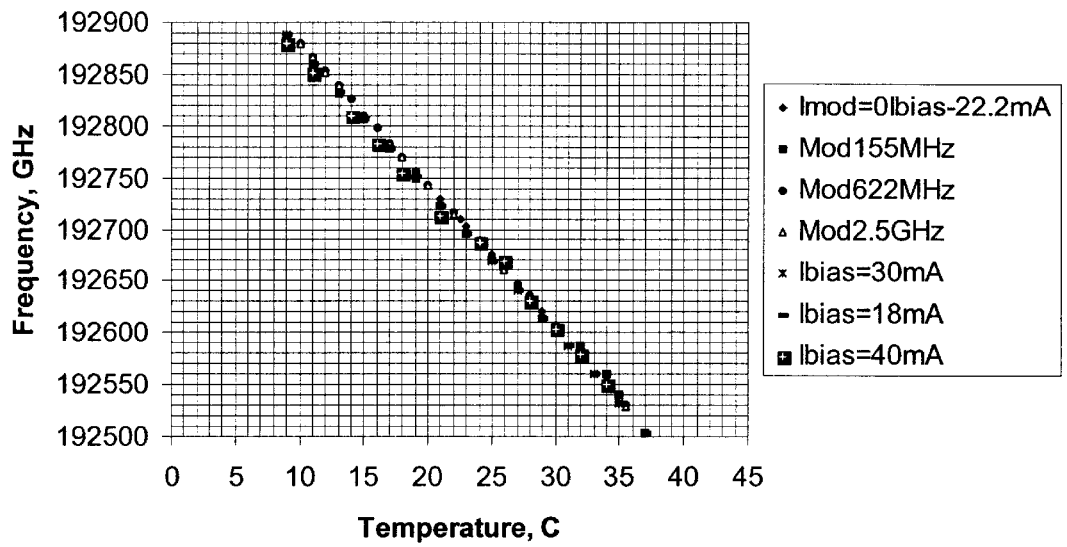
FIG. 5 is a graph of frequency versus temperature for a semiconductor DFB laser at different bias currents.
Figure 6:
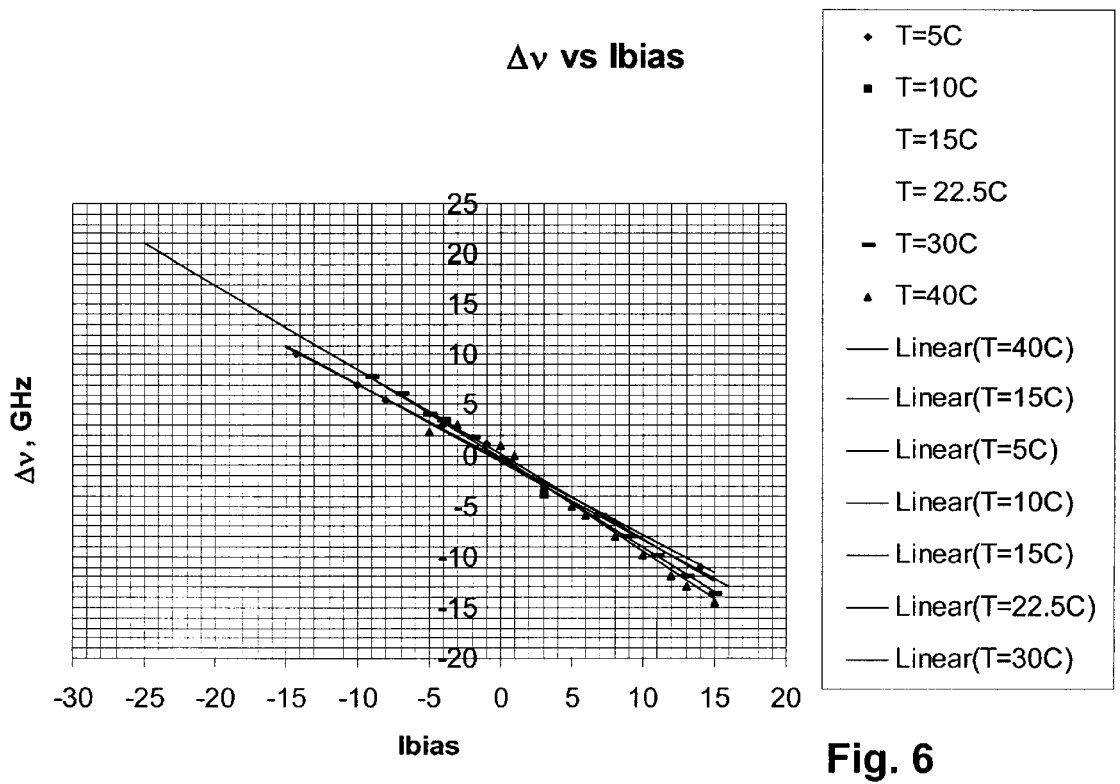
FIG. 6 is a graph of change in frequency versus bias current for the same semiconductor DFB laser at different temperatures.

This feedback arrangement permits for conventional control of the output power and wavelength of each semiconductor laser of the optical transmitter, as explained previously. For example, when the output power of a laser operated at an ITU channel wavelength is to be changed to maintain a flat power distribution over the wavelength channels, the bias current of the semiconductor laser is varied. FIG. 2 illustrates this output power/bias current $I_{bias}$ relationship empirically for DFB (Distributed FeedBack) lasers at different temperatures. However, a change in $I_{bias}$ invariably changes the output wavelength of the semiconductor laser, as shown in FIG. 6. On the other hand, the wavelength (the inverse of the frequency ν) is also controlled by the operating temperature of the laser, as illustrated by the plot in FIG. 5. Thus, while the power is varied, a temperature change is used to compensate for the wavelength change in the opposite direction to regain the original wavelength. This step in turn changes the power again, and the process repeats itself. This iterative process can be carried out by the current control block 14, temperature control block 13 and detection and processing block 15, under the direction of the control unit 16 to reach a final, new set point of output power and unchanged wavelength.

On the other hand, the present invention combines theoretical analysis with empirical theoretically modeled data to create a closed form solution so that the desired output power and output wavelength can be effectively set by one-time changes to the temperature and bias current. Not only does the present invention permit the output power of the optical transmitter to be changed without the changing the wavelength of the signal, but also the wavelength of the signal can be varied without changing its power. The closed form solution starts with theoretical relationships of frequency ν, i.e., wavelength, and output power P to temperature and driving bias current of the semiconductor laser. Empirical data provide the values for the temperature and bias current coefficients. The particular closed form solution is different for different semiconductor laser structures (DFB lasers are used below), as well as for the same semiconductor laser structures from different vendors.

The output power P for a semiconductor laser can be described theoretically in terms of phenomenological model for the linear portion of the power-bias current curve:

$$P_o(T_o) = \eta_o(T_o) * (I_o - I_{th}(T_o)) \quad (1)$$

where $P_o$ is initial output power, $\eta_o = \Delta P/\Delta I$, the slope efficiency at temperature $T_o$ and driving bias current $I_o$.

The temperature dependencies of $I_{th}$ and $T_o$ are:

$$I_{th} = A \exp(T/T_o^*) \quad (2)$$

$$\eta = B \exp(T/T_1^*) \quad (3)$$

where A, B, $T_o^*$ and $T_1^*$ are constant parameters defined by the particular laser design.

Figure 3:
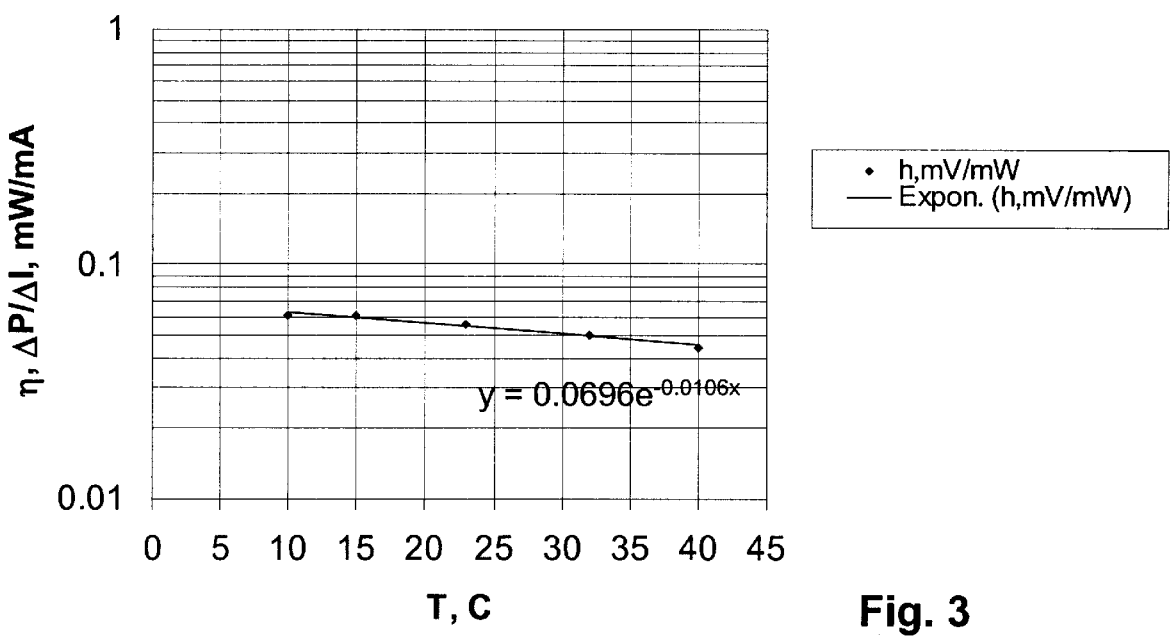
FIG. 3 is a graph of slope efficiency versus temperature from the FIG. 2 graph data.
Figure 4:
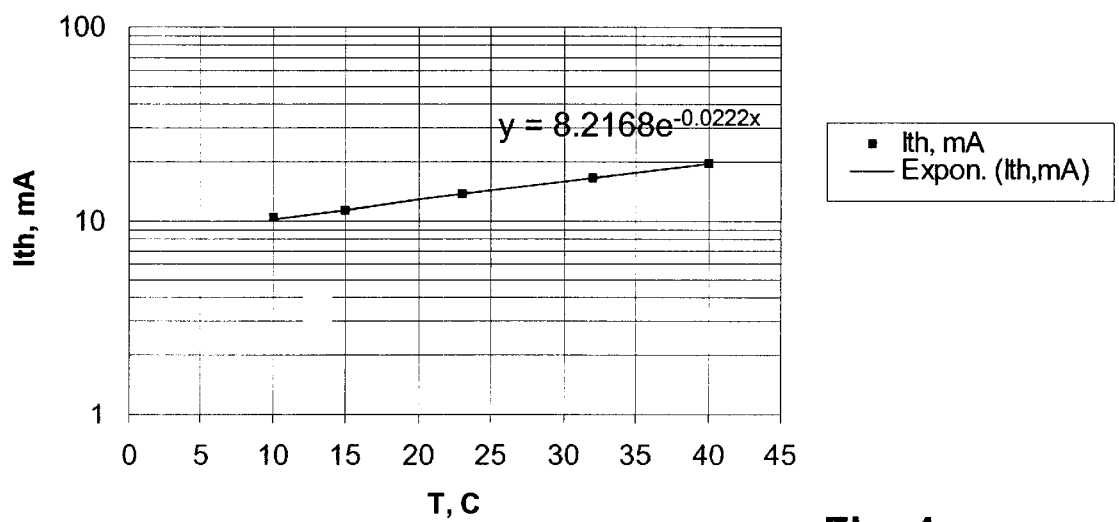
FIG. 4 is a graph of threshold current versus temperature from the FIG. 2 graph data.

P-I (power versus bias current) characteristics, such as illustrated in FIG. 2, were obtained for a set of five WDM DFB semiconductor lasers, in this case, FLD5F6CX-H Fujitsu lasers. FIG. 2 shows the P-I dependence at different temperatures for one of the measured lasers. From the temperature dependencies of the slope efficiency η (see FIG. 3) and threshold current $I_{th}$ (see FIG. 4), the parameters $T_o^*$ and $T_1^*$ are derived. The mean value of $T_o^* = 44°$ was obtained from the five lasers and used for calculations described below. It should be noted that this value of $T_o^*$ varies from laser to laser by not more than ±5%. The values of $T_1^*$ varies from laser to laser within the temperature range 90°–160° C.

The final (targeted) output power $P_1$ at new temperature $T_1$ and bias current $I_1$ (using equations (2) and (3)) becomes:

$$P_1 = \eta_o \exp(\Delta T/T_1^*)(I_o + \Delta I - I_{tho} \exp(\Delta T/T_o^*)) \quad (4)$$

or $$\Delta I = I_{tho} \exp(\Delta T/T_o^*) - I_o + P_1/\eta_o \exp(\Delta T/T_1^*) \quad (5)$$

From equation (1):

$$I_o P_o/\eta_o + I_{tho} \quad (6)$$

Using equations (5) and (6):

$$\Delta I = I_{tho}[\exp(\Delta T/T_o^*) - 1)] + 1/\eta_o[P_1 \exp(\Delta T/T_1^*) - P_o] \quad (7)$$

The solution to equation (7) requires the dependencies of frequency ν on temperature T and bias current I, which are obtained empirically by measuring the frequency dependencies on temperature and bias current. In the present case, the dependencies are derived from the set of Fujitsu lasers described above. FIG. 5 represents the frequency dependency on temperature at different driving (bias) currents. FIG. 6 shows the current dependency on frequency at different temperatures for the same laser. The dependency can be described by the following linear formula:

$$\Delta \nu = \alpha_t \Delta T - (\alpha_i + \beta_i \Delta T) \Delta I \quad (8)$$

or $$ti\ \Delta I = -(\Delta v + \alpha_t \Delta T)/(\alpha_i + \beta_i \Delta T) + tm \quad (9)$$

where $\Delta v = v_1 - v_o$ is frequency change caused by temperature change $\Delta T$ and current change $\Delta I$; and $\alpha_i = \Delta v/\Delta I$, when $\Delta T = 0$;

$\alpha_t = \Delta v/\Delta T$, when $\Delta I = 0$.

The $\beta_i$ coefficient represents the temperature dependence of $\alpha_i$ on temperature. Note that the coefficients $\alpha_i$, $\alpha_t$, $\beta_i$ are defined experimentally. See the plots in FIGS. 6 and 7. It should be further noted, that $\alpha_t$ varies from 13.6 GHz/° C. to 14.1 GHz/° C. from laser to laser and at different modulation currents and bit rates. At the same time, the variations of $\alpha_i$ do not exceed ±10%. The $\beta_i$ variations are small and within ±1.5%. From equations (7) and (9), the following equation is generated:

$$I_{tho}[\exp(\Delta T/T_o^* - 1)] + 1/\eta_o[P_1 \exp((\Delta T/T_1^*) - P_o] + (\Delta v + \alpha_t \Delta T)/\alpha_i + \beta_i \Delta T) = 0 \quad (10)$$

By solving equation (10), the necessary temperature change $\Delta T$ is found for desired output power change, $P_1 - P_o$. Then, by solving equation (9), one can find driving current change $\Delta I$ for desired frequency change $\Delta v$. The calculations are done using the parameters $P_o$, $\eta_o$, $v_o$, $I_{tho}$ provided by the manufacturer. $T_o^*$ and $T_1^*$ as well as $\alpha_i$, $\alpha_t$, $\beta_i$ were determined empirically from a statistically significant sample of laser modules.

Figure 7:
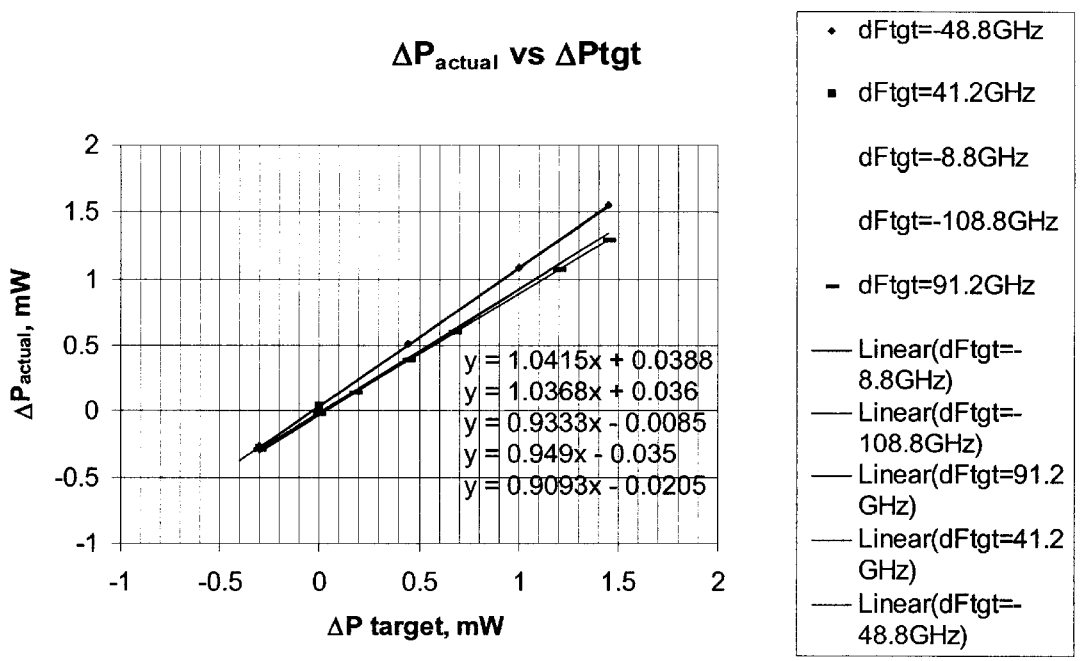
FIG. 7 is a graph of the actual change in output power versus the targeted change in output power for the semiconductor DFB laser.
Figure 8:
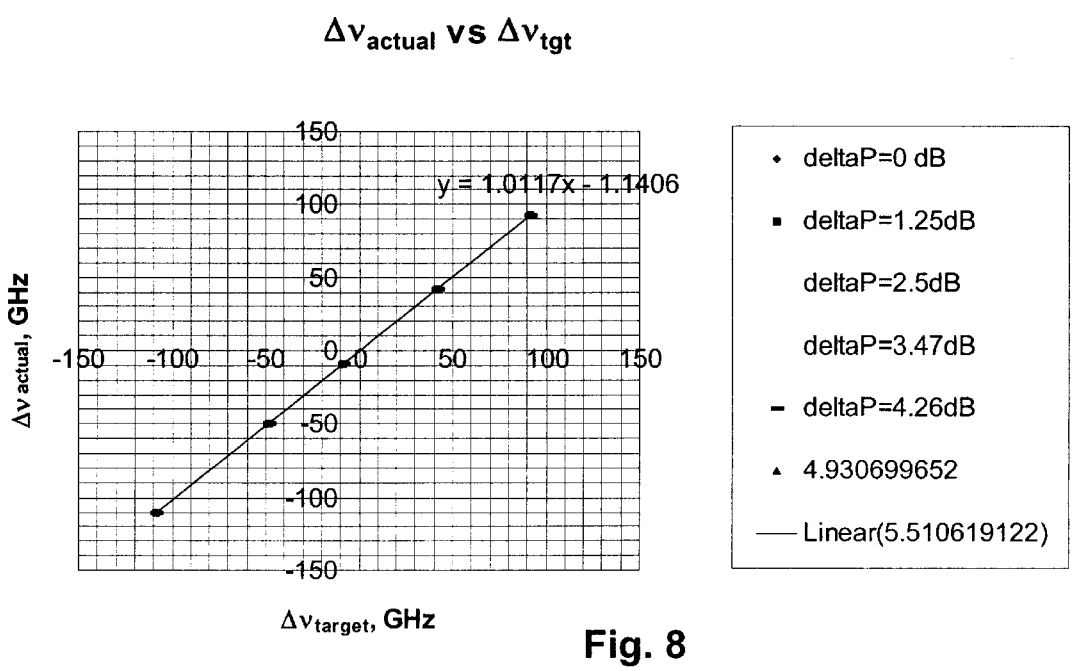
FIG. 8 is a graph of the actual change in frequency versus the targeted change in frequency for the semiconductor DFB laser.

The calculations presented above are performed on semiconductor lasers provided by a specific laser vendor. The desired frequency change varied in the range of ±100 GHz. The desired output power change varied in the range ±3 dB. The resulting values of power and frequency (obtained by wavelength and power meters) were compared with the desired targeted values. The results are presented on FIGS. 7 and 8. FIG. 7 shows the deviation of actual output power P from the desired power P at different targeted frequencies for one of the lasers. FIG. 8 shows the deviation of the actual frequency from the targeted frequency for different targeted output power P for the same laser. The graphs in both FIGS. 7 and 8 indicate good agreement between the calculated targeted values and resulting actual ones.

The margins of frequency change and power change for each phenomenological parameter change were estimated. The experimental results are presented in the following table: For $\Delta v_{tgt} = \pm 100$ GHz; $\Delta P_{tgt} = \pm 3$ dB:

| $T_o^*$, K | $T_1^*$, K | $\alpha_i$, GHz/C | $\alpha_t$, GHz/C | $\Delta T$ actual, C | $\Delta v$ actual, GHz | $\Delta I$ actual, mA | $\Delta P$ actual, dB |
|---|---|---|---|---|---|---|---|
| 44 ± 10% | 120 | 0.86 | 14 | ±0.1 | ±1.5 | ±0.25 | ±0.05 |
| 46 | 120 | 0.86 | 14 | ±0.02 | ±0.3 | ±0.9 | ±0.2 |
| 46 | 120 | 0.86 ± 10% | 14 | ±0.3 | ±2.1 | ±0.16 | ±0.02 |
| 46 | 120 | 0.86 | 13.56–14.11 | <±0.3 | <±4.2 | ±0.05 | ±0.05 |

The data above are from one type of semiconductor lasers, i.e., DFB (Distributed FeedBack) lasers. With the measured ($\alpha_i$, $\alpha_t$, $T_o^*$, $T_i^*$), one could easily adjust the laser to well within the system tolerances of ±5 GHz in frequency and ±0.1 dB in power. The combination of theoretical analysis combined with empirical data works well with other types of lasers, such as DBR (Distributed Bragg Reflection) lasers. Of course, the coefficients should be derived from empirical data for lasers which match the semiconductor laser actually used as closely as possible. For example, the difference between the expected and actual results might be narrowed greatly by using empirical data from the actual semiconductor laser to determine the coefficients.

Figure 9:
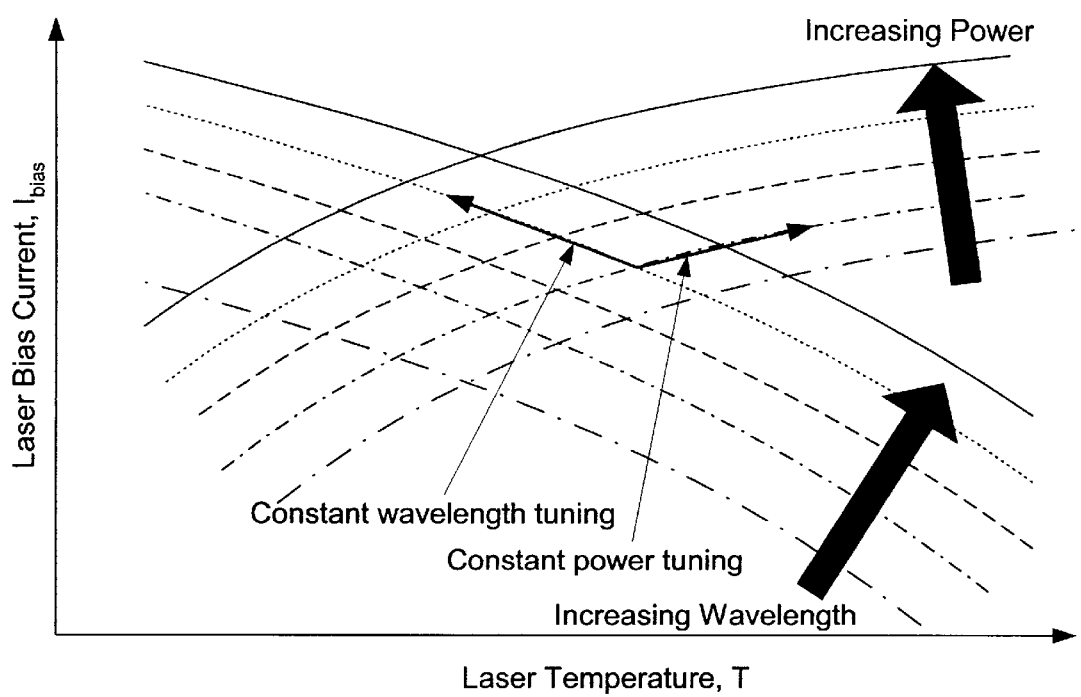
FIG. 9 is a general graph of the bias current versus temperature for a semiconductor laser illustrating lines of varying output power with constant wavelength (frequency) and of varying wavelength (frequency) with constant output power.

The results in accordance with the present invention are a closed form solution of the dependencies of output power and wavelength upon bias current and temperature. This permits the control unit 16 to have effective control over the output power and wavelength of the laser module 10. By storing the equations (9) and (10) above with the empirically determined coefficients into memory associated with microprocessor, microcontroller or digital signal processor in the control unit 16. With this control, output power and wavelength can be determined and set with one-time values of temperature and bias current. FIG. 9 is an explanatory graph which illustrates how the bias current and temperature can be changed so that the output power can be varied with a constant wavelength and how the wavelength can be varied with constant power. The present invention allows the determination of these values for bias current and temperature to be made efficiently. Of course, the present invention allows the bias current and temperature to be determined for variation of both power and wavelength as desired.

An application of the efficaciousness of the present invention in varying the output wavelength of the semiconductor laser with constant power can be seen by considering the requirements of DWDM networks again. Optical signals should not drift from their defined ITU wavelength channel in such networks; the wavelengths should be locked in. This can be performed by arranging absolute wavelength optical reference filters on the output of the laser to generate an error signal indicative of the deviation of output wavelength from the wavelength channel. The error signal is received by a control element which moves the output wavelength in the correct direction. Such a feedback path is shown in FIG. 1. Filters in the detection and processing block 15 can generate a deviation signal for the control unit 16.

Besides varying the output power with a constant wavelength and varying the wavelength with constant power, the present invention can be used to create predetermined operating set points for the laser of the optical transmitter. From the inter-relation between the laser output wavelength and power, and operating temperatures and bias current, operating points of desirable wavelengths and power can be calculated and set into the memory of the control unit 16. The laser can be placed at one of these operating points by having the control unit 16 to immediately instruct the laser to operate at the selected operating point. For a typical single mode semiconductor laser, the optical transmitter can be ready to be tuned over 500 GHz and to one of at least eight to nine ITU channel wavelengths at 50 GHz spacing. More wavelengths are possible, limited only by the physical properties of the laser. In addition, the power of the transmitter can be varied by as much as 6 dB, while maintaining the same wavelength.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. In a laser transmitter system for a DWDM network, said laser transmitter system having a semiconductor laser generating an output for said laser transmitter system and a control unit for controlling operations of said semiconductor laser, a method of operating said laser transmitter system comprising storing in said control unit a closed mathematical form relating variables of output power, wavelength, bias current and operating temperature of said semiconductor laser, said variables related to each other by empirically determined coefficients;

storing in said control unit said empirically determined coefficients; and setting said temperature to achieve the desired output power and wavelength of said semiconductor laser according the said closed mathematical form and empirically determined coefficients; and setting said bias current based upon the temperature setting to achieve the desired wavelength of said semiconductor laser according the said closed mathematical form and empirically determined coefficients.

2. The method of claim 1 wherein said closed mathematical form comprises $$I_{tho}[\exp(\Delta T/T_o^*-1)]+1/\eta_o[P_1\exp((\Delta T/T_1^*)-P_o]+(\Delta v+\alpha_t\Delta T)/(\alpha_f+\beta_i\Delta T)=0$$

where $\Delta T$ comprises a change in said operating temperature, $P_1-P_o$ comprises a change in said output power, and $\Delta v$ is a change in frequency, and $I_{tho}$, $T_o^*$, $\eta_o$, $T_1^*$, $P_o$, $\alpha_t$, $\alpha_i$, and $\beta_i$ comprise said empirically determined coefficients.

3. The method of claim 2 wherein said closed mathematical form solution further comprises $$\Delta I=-(\Delta v+\alpha_t\Delta T)/(\Delta_f+\beta_i\Delta T)$$

where $\Delta I$ comprises a change in said bias current.

4. The method of claim 1 wherein said semiconductor laser comprises a DFB laser.

5. The method of claim 1 wherein said semiconductor laser comprises a DBR laser.

6. The method of claim 1 wherein said setting of said temperature and bias current comprises keeping said wavelength constant as said output power is varied.

7. The method of claim 1 wherein said setting of said temperature and bias current comprises keeping said output power constant as said wavelength is varied.

8. The method of claim 1 wherein said setting of said temperature and bias current comprises varying said output power and said wavelength.

9. The method of claim 1 further comprises storing in said control unit a plurality of set points of output power, wavelength, bias current and operating temperature according to said closed mathematical form and empirically determined coefficients for said semiconductor laser; and wherein said setting of said temperature and bias current comprises jumping to one of said points responsive to said control unit.

10. In a laser transmitter system for a DWDM network, said laser transmitter system having a semiconductor laser generating an output signal for said laser transmitter system, said output signal having power and a wavelength, a method of operating said laser transmitter system comprising setting an operating temperature of said semiconductor laser to achieve the desired power and wavelength of said semiconductor laser according the a closed mathematical form relating variables of output power, wavelength, bias current and operating temperature of said semiconductor laser, said variables related to each other by empirically determined coefficients; and setting said bias current based upon the temperature setting to achieve the desired wavelength of said semiconductor laser according the said closed mathematical form and empirically determined coefficients.

11. The method of claim 10 wherein said closed mathematical form comprises $$I_{tho}[\exp(\Delta T/T_o^*-1)]+1/\eta_o[P_1\exp((\Delta T/T_1^*)-P_o]+(\Delta v+\alpha_t\Delta T)/(\alpha_f+\beta_i\Delta T)=0$$

where $\Delta T$ comprises a change in said operating temperature, $P_1-P_o$ comprises a change in said output power, and $\alpha v$ is a change in frequency, and $I_{tho}$, $T_o^*$, $\eta_o$, $T_1^*$, $P_o$, $\alpha_t$, $\alpha_i$, and $\beta_i$ comprise said empirically determined coefficients.

12. The method of claim 11 wherein said closed mathematical form solution further comprises $$\Delta I=-(\Delta v+\alpha_t\Delta T)/(\alpha_f+\beta_i\Delta T)$$

where $\Delta I$ comprises a change in said bias current.

13. The method of claim 10 wherein said setting of said temperature and bias current comprises keeping said wavelength constant as said output power is varied.

14. The method of claim 10 wherein said setting of said temperature and bias current comprises keeping said output power constant as said wavelength is varied.

15. The method of claim 10 wherein said setting of said temperature and bias current comprises varying said output power and said wavelength.

16. The method of claim 10 further comprises predetermining a plurality of set points of output power, wavelength, bias current and operating temperature according to said closed mathematical form and empirically determined coefficients for said semiconductor laser; and wherein said setting of said temperature and bias current comprises jumping to one of said predetermined set points.

* * * * *